Oct. 11, 1955     A. A. CZECH     2,720,035
DEVICE FOR THE PREDETERMINATION OF THE RADIAL DIMENSIONS
OF THE BITS OF CIRCULAR FORMING CUTTERS
Filed Nov. 28, 1952     3 Sheets-Sheet 1
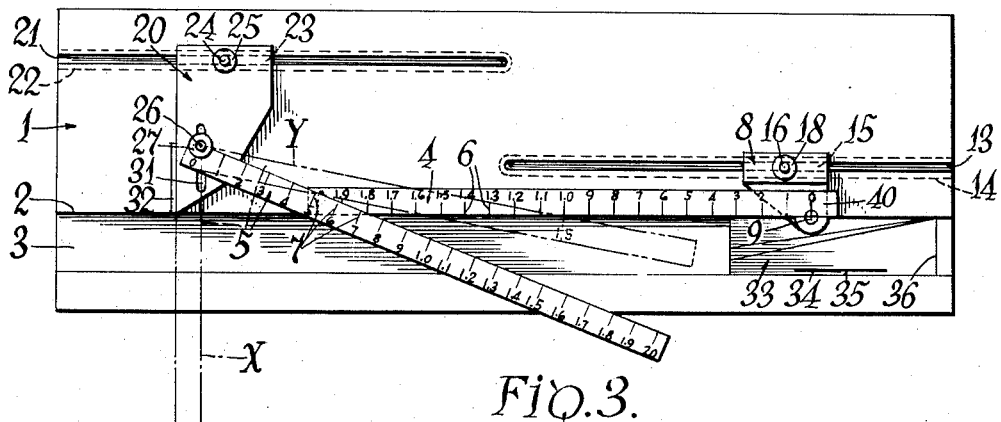
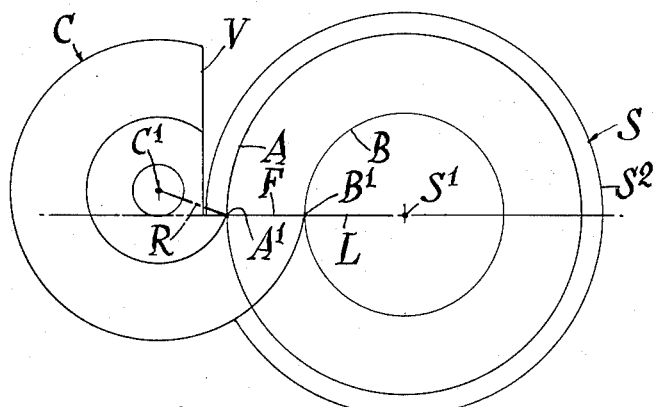
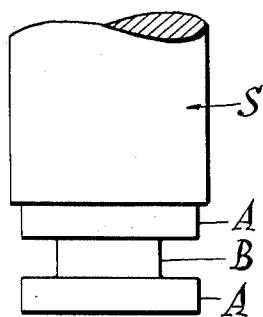
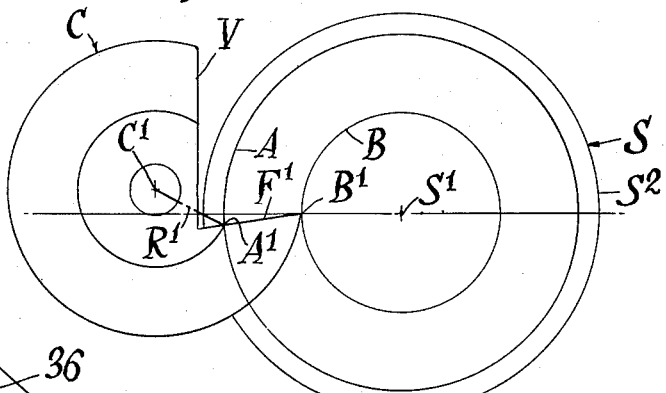
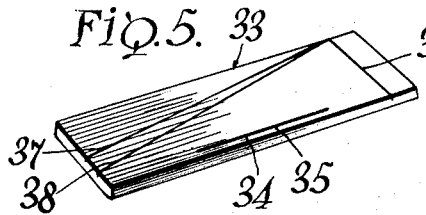
INVENTOR.
Adam A. Czech,
BY
John Lowers.
ATTORNEY.

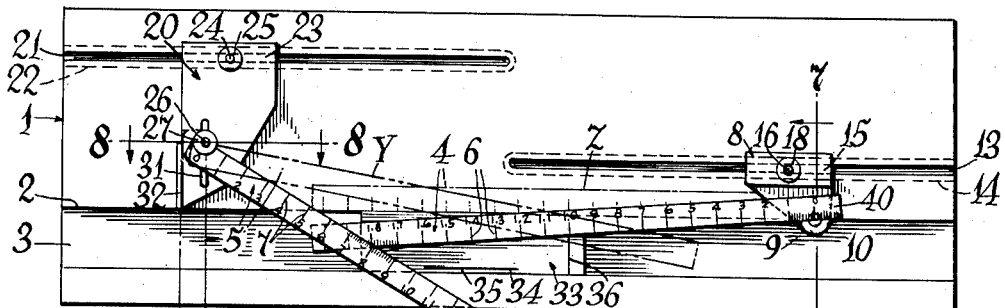
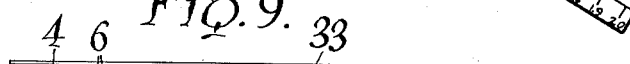
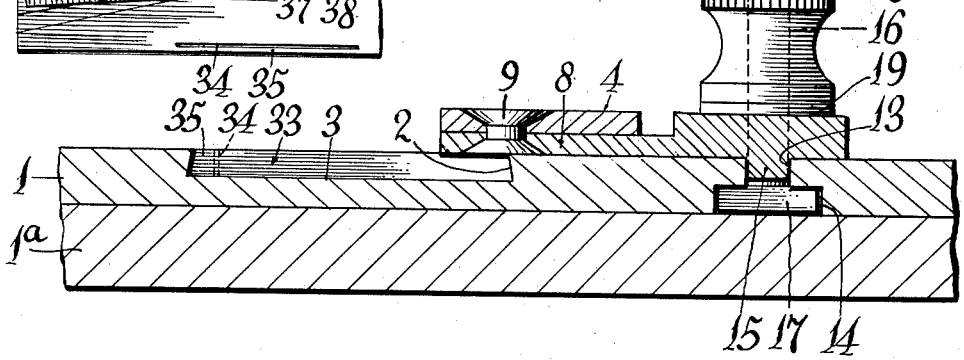
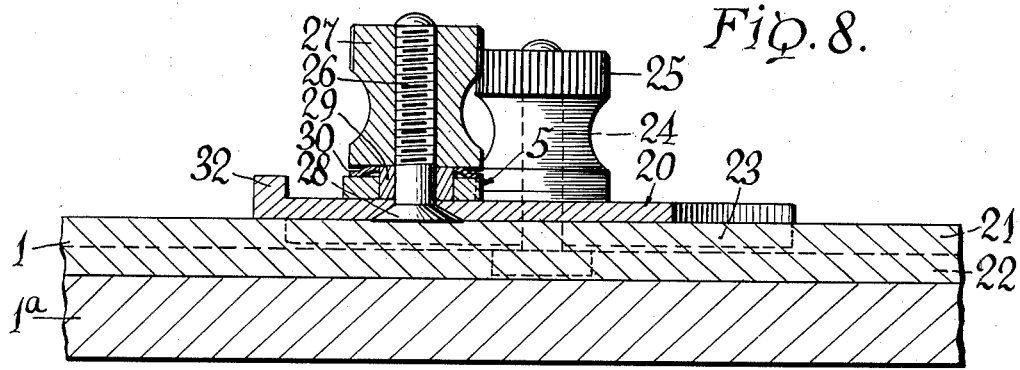

Oct. 11, 1955 A. A. CZECH 2,720,035
DEVICE FOR THE PREDETERMINATION OF THE RADIAL DIMENSIONS
OF THE BITS OF CIRCULAR FORMING CUTTERS
Filed Nov. 28, 1952 3 Sheets-Sheet 3
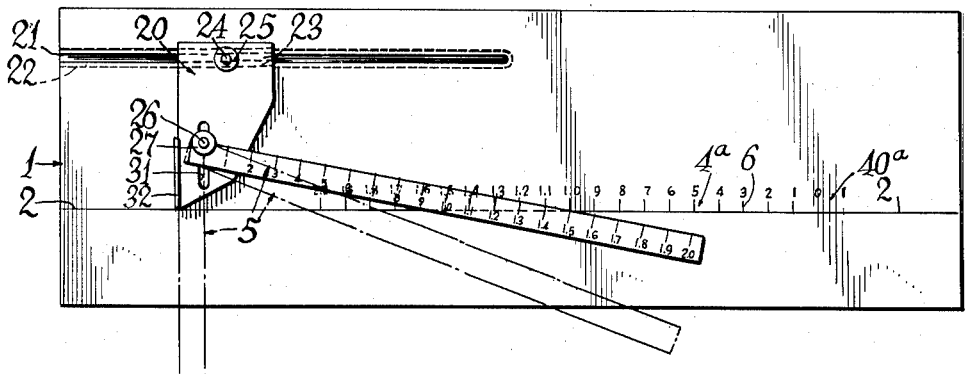
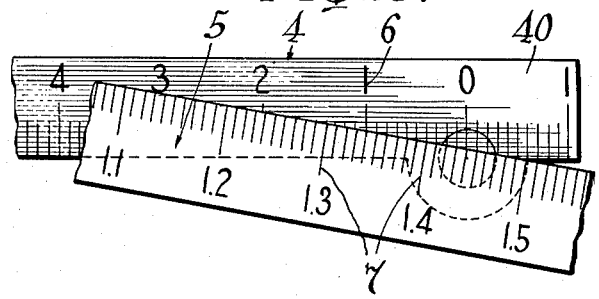
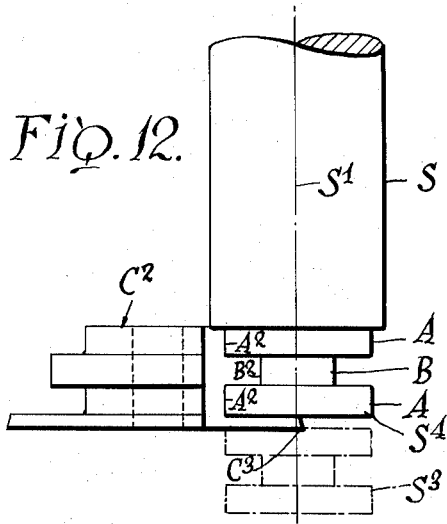
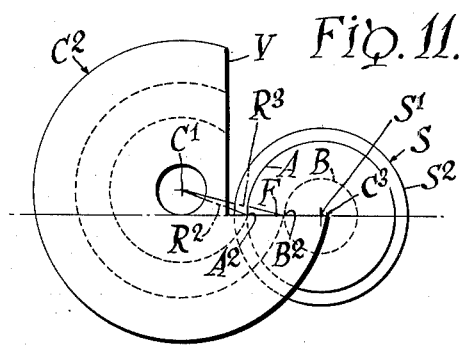
INVENTOR.
Adam A. Czech,
BY
*[signature]*
ATTORNEY

United States Patent Office 2,720,035
Patented Oct. 11, 1955

2,720,035

DEVICE FOR THE PREDETERMINATION OF THE RADIAL DIMENSIONS OF THE BITS OF CIRCULAR FORMING CUTTERS

Adam A. Czech, Buffalo, N. Y.

Application November 28, 1952, Serial No. 323,083

8 Claims. (Cl. 33—201)

This invention relates to a device for use in the preparation of working drawings of circular forming cutters and proposes a device for the rapid, facile and accurate predetermination of the radial dimension, to be marked upon the working drawing, of any inner cutting edge or bit, that is to say a cutting edge or bit to be located inwardly of the periphery of the cutter and to be formed with or without a rake angle.

When the circular faces have been cut upon the bar stock the cut section is severed in order that it may be processed in any machine or machines which will produce the particular article desired, the number of circular cuts of course varying with the form of the end product, i. e., the ultimate article. Thus the bar stock section may be cut with two or several concentric circular faces. The variations in the number of circular faces and in their diameters are through a range as indefinite as the ultimate forms of the articles to be made from the bar stock. Hence the circular forming cutters cannot be standardized but must be "tailor made" for each particular job.

According to the practice heretofore the radial dimensions of the inner cutting edges or bits are computed mathematically from certain known factors. The computation in any case requires considerable time which, of course, varies with the required form of cutter and which in many cases will be several hours. Where the bit is to be formed with a rake angle the computation involves sundry trigonometric calculations which add to the time required for the determination of the radial dimension of the bit. In many cases where a rake angle is desirable it is not provided because of the difficulty of accurately determining the radial dimension of the bit as based upon a predetermined rake angle. The outlay of time required for computing the radial dimensions of the inner cutting edges or bits involves a serious increment of cost in the manufacture of the cutter. In addition the computations, unless carefully checked with an additional expenditure of time, involve the hazard of error. The known factors upon which the computations are based are the diameters of the circular faces to be cut upon the bar stock; the distance above a horizontal center line coincident with the axial center of the bar stock of the radial center of the cutter as mounted in the screw machine; the length of the radius of the cutter; and where a rake angle is to be provided the particular degree of angularity desired.

The cutter is fashioned from a section of tool steel of circular cross section, the axial center of which becomes the radial center of the cutter. In the screw machine the bar stock is rotated about its axial center and the cutter is held against rotation and continuously fed along a straight path toward the bar stock until the circular faces have been cut to the predetermined diameters. The extent of such feed movement is, of course, predetermined and when the limit has been reached the feeding of the cutter is automatically discontinued, this involving the use of certain standard precision indexing features which are initially set or adjusted by the operator of the machine. The locations of the radial center of the cutter above the horizontal center line coincident with the axial center of the bar stock will vary with the diameter of the cutter and also may vary accordingly as the screw machines may be of different models or the products of different manufacturers. In any case the distance of the radial center of the cutter above the horizontal center line is a known factor.

The bar stocks vary in diameter through a wide range, the diameter of a particular bar stock being selected according to the form and transverse dimensions of the end product. In many cases the diameter of the bar stock is such that the radial distance between its axial center and its periphery is less than the extent of the face of the bit which coincides with the periphery of the cutter. In such cases the cutters have been so made that a peripherally located bit is used to cut from the bar stock the part upon which the circular faces have been formed, this bit thus serving the purpose of the separate cut-off tool which is required in cases where the radial distance between the axial center of the bar stock and its periphery is greater than the extent of the face of a bit which coincides with the periphery of the cutter.

The principal object of the invention is to provide a simply constructed and inexpensive device in which the known factors may be quickly reproduced and by which the determination of the dimensions of the inner cutting edges or bits, including those which are to be formed with rake angles, may be easily made in two or three minutes and without liability of error, the necessity for mathematical computation being entirely eliminated.

A further object is to provide a device in which the radial dimensions of the inner cutting edges of bits may be readily determined in cases where the cutter has a peripherally located bit which is used for severing from the bar stock the section upon which circular faces have been cut.

With the above objects in view a device in accordance with the invention is generally characterized by two cooperating straight bar scales which may be conveniently distinguished as a "circular forming" scale and a "bit scale," these scales being mounted on a flat base and in their cooperative capacity also being in cooperation with a horizontal line marked on the base and representing the horizontal center line above mentioned. The bit scale is connected to the base by a pivot operatively located to correspond to the axial center of the cutter and in the use of the device is adjustably or positionably movable about its pivot, such movement being across the circular forming scale. In the use of the device in cases where the cutter bits do not require rake angles the circular forming scale has a fixed location in which its calibrated edge coincides with the line marked on the base. In the use of the device in cases where the cutter bits require a rake angle the circular forming scale is also connected to the base by a pivot which is operatively located to correspond to the axial center of the bar stock, the circular forming scale being movable about its pivot to a position of downward inclination in which its calibrated edge intersects the calibrated edge of the bit scale. In respect to the determination of the radial dimension of a cutting edge or bit to be provided with a rake angle the device is also characterized by an adjustable element which bears a line marking corresponding to the predetermined rake angle and which may be positioned for cooperation with both of the scales. In the use of the devices in cases where a bit located at the periphery of the cutter is to serve the purpose of a cut-off tool for severing from the bar stock the section upon which the circular faces have been formed the device is also characterized by a calibrated extension of the circular forming scale, this extension being beyond the zero point of the circular forming scale and being cooperative with the bit scale.

In the drawings:

Figure 1 is a plan view showing a construction of the device which is available for all uses, that is to say in cases where the inner bits are to be formed without rake angles or with rake angles and in cases where a bit at the periphery of the cutter is to serve the purpose of a cut-off tool. This figure shows the steps in the use of the device in cases where the bits do not require rake angles.

Figure 2 is an elevation of a section of bar stock upon which circular faces have been cut by a circular forming cutter, the circular faces shown in this figure being selected as an example and consisting of two faces of the same maximum diameter and an intermediate face of less diameter.

Figure 3 is a diagrammatic view showing the operation of a circular forming cutter for cutting the circular faces shown in Figure 2 and wherein the cutting edges or bits are not provided with rake angles. This figure assumes an instance in which the radial distance between the axial center of the bar stock and its periphery is greater than the extent of the face of a bit which coincides with the periphery of the cutter and hence where a separate cut-off tool must be used to cut from the bar stock the section upon which the circular faces are formed.

Figure 4 is a diagrammatic view of the same general character as Figure 3 but showing the operation of a circular forming cutter for cutting the circular faces shown in Figure 2 and wherein the bits are provided with a rake angle.

Figure 5 is a perspective view of the adjustable element which bears a line marking corresponding to a predetermined rake angle and which may be positioned for cooperation with the bar scales.

Figure 6 is a plan view of the device in the same form in which it is shown in Figure 1 but showing its manner of use in the predetermination of the radial dimension of an inner cutting edge or bit for which a rake angle is required.

Figure 7 is a detail vertical sectional view upon the line 7—7 of Figure 6.

Figure 8 is a detail horizontal sectional view upon the line 8—8 of Figure 6.

Figure 9 is an enlarged plan view of the adjustable element and the circular forming scale in operative relation in the final step of the use of the device when a rake angle is required, the parts being shown on an exaggerated scale in order to promote clarity of illustration.

Figure 10 is a plan view showing a construction of the device which is restricted in use to cases where the inner bits are not to be formed with rake angles. This figure also shows a modification in respect to the bar scale which constitutes the circular forming scale.

Figure 11 is a diagrammatic view of the same general character as Figure 3 but showing the operation of a circular forming cutter for cutting circular faces as shown in Figure 2 and wherein a peripherally located bit is used for severing from the bar stock the section upon which the circular faces have been formed. This figure assumes that the bits are not provided with rake angles and shows the position of the cutter relatively to the bar stock at the completion of the operation of cutting circular faces upon a succeeding section of the bar stock and of cutting from the bar stock a preceding section upon which circular faces have been formed in a preceding operation.

Figure 12 is a plan view of the bit bearing portion of the cutter in operative relation to a length of bar stock shown in elevation. In this figure the cutter and the bar stock are shown in an operative relation which corresponds to that assumed by the diagram of Figure 11.

Figure 13 is a detail fragmentary plan view of the circular forming scale as provided with an extension beyond its zero marking and as in cooperative relation to the bit scale in that phase of use which is required when the cutter has a peripherally located bit that is to be used for the purpose of cutting from the bar stock a section upon which circular faces have been formed.

In the following description words indicative of directions or positions, such as "upper," "lower," "horizontal" and "vertical" are used, as a matter of brevity and convenience, with reference to the positions in which the various parts are shown in Figures 1, 6, 10 and 13.

The device includes a flat base 1 upon which the adjustably movable parts are mounted. The base 1 is preferably made of metal and reinforced by a section 1a, preferably of plywood, attached to its under face. The base 1 is marked with a straight horizontal line 2 which corresponds to the horizontal center line coincident with the axial center of the bar stock. In the embodiment shown in Figures 1 and 6 the line 2 is provided by the upper wall of a horizontal recess 3 which has its utility in cases where the radial dimension to be measured extends to the face of a rake angle.

The determination of the radial dimension of the inner cutting edge or bit involves the use cooperatively of two straight bar scales 4 and 5. The scale 4 may be called a "circular forming" scale and the scale 5 may be called a "bit scale." The scale 4 has numbered calibrations 6 along its lower edge and the scale 5 has numbered calibrations 7 along its upper edge, the numerals which identify the calibrations being in arithmetical progression toward the free ends of the scales. To promote convenience in reading the scales and accuracy in the determination of the measurement the calibrations as numbered are suitable multiples of the actual measurements. For example a scale length of ten inches, so designated on the scale, will represent a measurement of one inch in terms of the bar stock and cutter.

In the embodiment shown in Figures 1 and 6 the scale 4 is carried by a bracket 8 in the form of a horizontal plate which rests upon the base 1. The scale has at its inner end an opening for a pivot 9 by which it is connected to the bracket, the location of the pivot coinciding with the zero marking of the scale and representing the axial center of the bar stock upon which the circular faces are to be cut. The axial center of the pivot 9 is therefore coincident both with the lower edge of the scale 4 and with the line 2. The scale 4 adjoins the upper face of the bracket 3 and the pivot 9 is in the form of a rivet having its upper head flush with the exposed face of the scale and its lower head flush with the underface of the bracket. The connection provided by the rivet 9 is sufficiently tight to prevent accidental pivotal movements of the scale 4 while permitting manual movement of the scale in adjustment about its pivotal axis. The scales 4 and 5 may be of varying lengths, according to variations in the diametrical dimension of different cutters. Having regard to the use of scales of varying lengths the bracket 8 is preferably, although not necessarily, adjustable lengthwise of the base 1. For the purpose of such adjustment the base 1 is formed with registering narrower and wider horizontal slots 13 and 14 which extend to an end face of the base, the slot 13 being open to the upper face of the base 1 and the slot 14 being open to its under face. The bracket 8 is formed on its underface with a downwardly projecting rib 15 which has a close fit in the slot 13 and serves to prevent the bracket from turning in a horizontal plane relatively to the base 1. The bracket 8 has an opening for a bolt 16, the head 17 of which fits in the slot 14 and the shank of which projects through the opening and carries a clamping nut 18. A washer 19 is preferably interposed between the nut 18 and the upper face of the bracket 8. With the nut 18 backed off to a suitable extent the bracket 8 may be adjusted lengthwise of the base 1 to the desired position, the rib 15 exercising a guiding function and also preventing the bracket from turning about the bolt 16 as an axis, whereupon the nut 18 is tightened and the bracket is thereby fixed in the position to which it may be adjusted.

The scale 5 is carried by a bracket 20 in the form of a horizontal plate which rests upon the base 1 and is adjustable lengthwise of the board relatively to the bracket 8 which remains in a fixed position during the use of the tool. For the purpose of such adjustment the base 1 is formed with horizontal slots 21 and 22 similar in all respects to the slots 13 and 14 and extending to the other end face of the base; and the bracket 20 is positively guided and held against turning movement in a horizontal plane by a rib 23 which projects from its under face and engages in the slot 21, the bracket being fixed in any position to which it may be adjusted by a bolt 24 similar in form and arrangement to the bolt 16 and carrying a nut 25 similar in form and function to the nut 18, the nut 25 bearing upon a washer interposed between it and the upper face of the bracket 20.

The scale 5 has at its inner end an opening for a pivot 26 by which it is connected to the bracket 20, the pivot 26 being located in coincidence with the calibrated edge of the scale 5 and with the zero marking thereof, its particular location on the base representing the axial center of the cutter. The pivot 26 is provided by a bolt which carries a nut 27 located above the bracket 20, its head 28 being fitted in a countersunk opening in the bracket 20. The scale 5 is arranged above the bracket 20 and in the use of the device projects across the scale 4, being sufficiently resilient to enable this relation. A bearing sleeve 29 is fitted upon the shank of the pivot bolt and rests upon the bracket 20, the opening in the scale 5 to accommodate the pivot bolt also accommodating the bearing sleeve 29. A spring washer 30 functioning as a brake is interposed between the nut 27 and the scale 5, the central opening of the washer 30 accommodating the bearing sleeve 29.

The zero markings of the two scales are at their remotely related ends. Thus, Figure 1 of the drawings being considered, the zero marking of the circular forming scale 4 is at its right end and the zero marking of the bit scale 5 is at its left end.

As above noted the location of the axial center of the cutter above the axial center of the bar stock will vary for cutters of different diameters and also for screw machines of different models. Therefore the pivot 26 is adjustable vertically with relation to the line 2. For the purpose of such adjustment with countersunk opening in the bracket 20 for the pivot 26 is in the form of a vertical slot 31 in which the pivot 26 is slidably adjustable, the slot 31 providing a positive guide for the pivot 26 in its vertical positional adjustment. Since the distance of the radial center of the cutter above the axial center of the bar stock is a known factor it is reproduced in the device, immediately prior to its use, by an appropriate adjustment of the position of the pivot 26. In making this adjustment the nut 27 is backed off and the scale 5 is swung about the pivot 26 to a position in which it projects in normal relation across the line 2, this position being shown in Figures 1 and 6 by the broken lines X. In order that the swinging movement of the scale 5 to the position normal to the line 2 may be positively limited the bracket 20 is preferably provided with a marginal flange 32 against which the lower edge of the scale 5, at that time in a vertical position, will abut. When the scale 5 has been swung to the position X, the nut 27 remaining backed off, the scale, remaining normal to the line 2, is moved up or down to bring the pivot 26 into the required position, the flange 32 serving as a guide and the distance of the required position of the pivot 26 above the line 2 being measured along the calibrated edge of the scale. When the pivot 26 has been accurately positioned the nut 27 is tightened to fix it against movement in the slot 31. It is to be noted that the nut 27 as thus tightened does not interfere with the adjustment of the scale 5 about the pivot 26 in the use of the device, the scale 5 in such adjustment being moved manually and held in the position to which it is moved by the frictional braking pressure exercised by the spring washer 30.

In exemplification of the use of the device the assumption is made of three circular faces to be cut in the bar stock S (Figure 2), there being two faces A of the same maximum diameter and an intermediate face B of minimum diameter; and the further assumption is made that the radius of the bar stock is longer than the extent of the face of a peripherally located bit of the cutter.

The use of the device will first be explained in connection with a cutter having bits which are not provided with a rake angle. A cutter C for cutting the faces A and B is sufficiently shown in the diagram of Figure 3, this diagram also showing the relation of the cutter and the bar stock at the completion of the cutting operation. The cutter C is formed with a peripherally located bit B1 for cutting the face B and with bits A1 for cutting the faces A, it being understood that in the example assumed a bit A1 is located at each side of the bit B1 and that the bits A1 are the inner bits, the radial distance of which from the axial center C1 of the cutter (represented in the device by the pivot 26) is to be predetermined and marked on the drawing required by the tool maker. In the diagram of Figure 3 the radial dimension to be measured is indicated by the broken line R; the axial center of the bar stock S is designated as S1 (and is represented in the device as shown in Figures 1 and 6 by the pivot 9); and the center line coincident with the axial center S1 is designated L (and is represented in the device by the line 2).

The known factors are the diameter of the bar stock, the diameters of the circular faces to be cut and the distance of the axial center C1 of the cutter above the center line L. The face F which terminates in the bit for cutting the circular face of minimum diameter, this being the peripherally located bit B1 in the example assumed, is in a plane coincident with the center line L and extends along a horizontal chord of the periphery of the cutter C. The face F at its inner end meets the lower end of a vertical face V which extends along a vertical chord of the periphery of the cutter C. The extent of the face F is known since, with suitable allowance for clearance, it is measured as a fraction of the diameter of the bar stock between its periphery S2 and the periphery of the circular face B of minimum and known diameter. The determination to be made is the extent of the radial distance (represented by the line R) between the axial center C1 of the cutter and any bit located inwardly of the periphery of the cutter and at the end of a face coplanar (as in Figure 3) with the face F. In the example assumed the bits A1 are such inwardly located bits. It will, of course, be understood that a cutter may have several inner bits located at varying distances, radially measured, from its axial center C1, that the bit A1 is typical of any inner bit, and that the procedure in the use of the device is the same in all cases.

For the purpose of a specific example of the manner of use of the device the following assumptions may be made with reference to the circular faces A and B, the distance of the axial center C1 of the cutter above the center line L and the radius of the cutter C, viz: the face B has a radius of one inch; the face A has a radius of one and four-fifths inches; the distance of the axial center C1 above the center line L is one quarter of an inch; and the radius of the cutter is one and one-half inches.

The initial step in the use of the device is the location in the manner above explained of the pivot 26 at the proper distance above the line 2. On the assumption that the distance of the axial center C1 above the center line L is one quarter of an inch, with the scale in a position normal to the line 2, the reading of the scale (which as above explained is calibrated at a ratio of 10 to 1) for the proper location of the pivot 26 is taken at the point where it intersects the line 2 and will be two and one-half inches.

In the second step in the use of the device the bracket 8 is fixed in position in the manner above explained and the circular forming scale 4 is fixed in the position shown in Figure 1 in which its lower edge is coincident with the line 2. The second step involves the adjustable movement of the bracket 20 along the base 1 and the adjustable movement of the scale 5 about the pivot 26 and across the scale 4, these movements being continued and coordinated until the reading of fifteen inches (1.5) along the upper edge of the scale 5 (this reading corresponding to an inch and one half, the radius of the cutter) coincides with the reading of ten inches (1.0) along the lower edge of the scale 4 (this reading corresponding to an inch, the radius of the circular face B of minimum diameter). At this time the scale 5 will be in the position Y shown in broken lines in Figure 1 wherein its upper edge intersects the lower edge of the scale 4 at the point where the above noted readings coincide and the bracket 20 is thereupon fixed in position. The second step fixes the location of the pivot 26 as a point of reference complementary to the second point of reference provided by the pivot 9, this location of the pivot 26 corresponding to the location of the axial center of the cutter radially distant from the point at which the circular face of minimum diameter (the face B) intersects the horizontal center line (represented by the line 2) coincident with the axial center of the bar stock.

With the points of reference thus determined and fixed the third and final step in the use of the device is carried out. In this step the scale 4 remains in the position in which its calibrated lower edge coincides with the line 2 and the scale 5 is moved downward about its pivot 26 until its calibrated upper edge intersects the calibrated lower edge of the scale 4 at the reading point 1.8 of the scale 4, this reading point representing the radius of the circular faces A. These positions of the scales 4 and 5 are shown in full lines in Figure 1. The scales 4 and 5 will be stable in these positions, by reason of the braking effect of the pivot rivet 9 and the spring washer 30. With the scales in these positions the radial dimension of the bit A1 from the axial center C1 of the cutter, this dimension being indicated by the line R in Figure 3, is determined by the reading of the scale 5 at the point where its upper edge intersects the lower edge of the scale 4, that is to say at the point where the upper edge of the scale 5 is coincident with the reading 1.8 of the scale 4. In the example assumed this dimension is shown by the scale 5 to be 0.7235 inch.

In the drawings the scale 4 is shown as of a length which is merely sufficient for the dimension required to be determined in the example assumed. This limitation in the showing of the length of the scale 4 has been adopted merely because of the space limitation of the drawings and in order to promote clarity of illustration. It will, of course, be understood that in actual practice the scale 4 may be of a length sufficient for the full range of radial dimensions required to be determined in industrial practice and involving bar stocks of diameters greater than the diameter which has been assumed for the purpose of explanation and circular faces of greater maximum diameters than the maximum diameter (the diameter of the face A) which has been assumed for the purpose of explanation.

For the use of the device as above described in connection with a cutter having bits which are not provided with a rake angle the recess 3 is not required. Hence for this particular use, and as restricted to this particular use, the device may be made in the form shown in Figure 10 wherein the line 2 is provided by a separate marking on the plate 1. In the use above described the scale 4 is not moved about its pivot 9 but at all times remains in the position in which its calibrated lower edge is coincident with the line 2. Hence in the form shown in Figure 10 the pivot 9 is not required. In this aspect in the form shown in Figure 10 the scale 4, as a separate bar scale, may be fixed to the board 1 against movement. Figure 10 shows a modification in this regard in which the circular forming scale, here designated 4a, is imprinted or otherwise suitably marked upon the upper face of the base 1 with its lower edge provided by the line 2 above and along which the calibrations are marked. The use of the device in the form shown in Figure 10 in connection with a cutter having bits which are not provided with a rake angle involves precisely the same steps as above described for the like use of the device in the form shown in Figure 1 and Figure 10 therefore shows in solid and broken lines the same positions of the bit scale 5 that are shown in Figure 1.

When the bits of the cutter are to be provided with a rake angle the device, constructed as shown in Figures 1 and 6, includes an additional element mounted for positional adjustment. This element is in the form of a plate 33 which is fitted in the recess 3 and is adjustable therein along the length of the base 1. In order to prevent displacement of the plate 33 from the recess 3 the recess is preferably of dove-tail cross section and the plate 33 which has a close fit in the recess is of conformable cross section. In order to prevent too free displacement of the plate 33 from an operative position to which it has been moved in the recess 3 it is preferably formed close to one of its longitudinal edges with a longitudinal slot 34 of suitable length and the narrow strip of metal 35 at the outer side of the slot is peened outward to a slight extent whereby it may bear with frictional braking effect upon the adjacent wall of the recess 3. The plate 33 has a vertical cross line 36 on its exposed face. While this cross line could be functionally provided by the outer vertical edge of the plate, i. e. the edge nearer the pivot 9, it is preferably provided by a separate marking adjacent such edge. The plate is also marked with one or more inclined lines which extend from the upper end of the line 36, that is to say from the horizontal line 2, to the inner vertical edge of the plate, i. e. the edge further from the zero marking (or the pivot 9) on the scale 4. In Figure 5 two downwardly inclined lines 37 and 38 are shown. The degrees of inclination of the lines 37 and 38 with reference to line 2 accord with permissible rake angles (the lengths of the lines 37 and 38 in practice according with the usual range of the lengths of the relief faces provided by the rake angles) and the provision of two or more lines having different degrees of inclination enables the selection of a rake angle which will be best adapted for the purpose of the particular cutter to be made. Thus in Figure 5 the line 37 is assumed to have a ten degree downward inclination from the horizontal, corresponding to a ten degree rake angle, and the line 38 is assumed to have a twelve degree downward inclination from the horizontal, corresponding to a twelve degree rake angle.

When the bits are to be formed without a rake angle the plate 33 may be placed in an inactive or storage position at one end of the recess 3 as shown in Figure 1. When the bits are to be formed with a rake angle the plate 33 is moved along the recess 3 to an operative position as shown in Figure 6.

In the following explanation of the use of the device in cases where the cutter is to be provided with a rake angle the foregoing assumptions are continued and the added assumption is made that the rake angle is to be of ten degrees. The cutter C as provided with such a rake angle is sufficiently shown in the diagram of Figure 4, this diagram showing the relief face F1 of the bit B1 (the length of which is known) and also showing the relation of the cutter and the bar stock at the completion of the cutting operation. In the diagram of Figure 4 the radial dimension to be measured is indicated by the broken line R1 and is the radial distance of the bit A1 from the axial center C1 of the cutter. It will be noted that the bit A1 has a relief face coplanar with the face F1 and hence that the bit A1 is located in a lateral extension of the plane of the face F1.

The first two steps in the use of the device are as above described, that is to say in the first step the pivot 26 is located at the proper distance above the line 2 and in the second step the pivot 26 is located as a point of reference complementary to the second point of reference provided by the pivot 9.

At the completion of the second step the scale 4 will be in the position shown in full lines in Figure 1 and in the broken line Z in Figure 6, that is to say with its lower calibrated edge coincident with the line 2. With the scale in this position the third step in the use of the device is carried out. This step involves the movement of the plate 33 to a position wherein its cross line 36 coincides with the calibration 1.0 along the lower edge of the scale 4, this calibration corresponding to an inch, the radius of the circular face B of minimum diameter. The plate 33 is shown in this position in Figure 6.

With the plate 33 so located the fourth and final step in the use of the device is carried out. In this step the scale 4 is moved downward about its pivot 9 until its calibrated lower edge intersects the line 37 on the plate 33 at the calibration 1.8, this calibration corresponding to one and four-fifths inches, the radius of a circular face A. As above pointed out the line 37 has a downward inclination of ten degrees relatively to the line 2 and is used where the rake angle is to be of ten degrees. Of course if a rake angle of twelve degrees, for example, be desired the scale 4 will be moved until its lower calibrated edge intersects the line 38 at the calibration 1.8. The scale 5 is now moved about its pivot 26 until its upper edge intersects the lower edge of the scale 4 at the point where the reading of the scale 4 coincides with the line 37, that is to say at the calibration 1.8 on the scale 4. The distance measured on the calibrated upper edge of the scale 5 between such point of intersection (the reading 1.8 on the scale 4) and the pivot 26 will give the radial dimension (indicated by the line R1) between the axial center C1 of the cutter C and the bit A1 as located in the lateral extension of the plane of the face F1. In the example assumed this dimension is 0.7888 inch.

Figures 11, 12 and 13 illustrate the use of the device in cases where a peripherly located bit is to be used to cut from the bar stock the part upon which circular faces have been formed. For the purpose of such use the circular forming scale is provided with a coaxial short extension beyond its zero marking, i. e. an extension which projects beyond the zero marking in a direction opposite to the direction in which the body of the scale projects. In Figures 1 and 6 this extension is designated as 40 and in Figure 10 it is designated as 40a, the manner of use being the same in both instances.

In explaining this use of the device the previous assumption of dimensions is not continued but the bar stock may be assumed to be solid and the section upon which circular faces are to be cut to be of the same form as that shown in Figure 2 and therefore to have two faces A of maximum diameter and an intermediate face B of minimum diameter. Cutters in which a peripherally located bit is used to cut from the bar stock the part upon which circular faces have been formed are well known in the art and such a cutter C2, fashioned for cutting the circular faces A and B, is shown in Figure 12 and in the diagram of Figure 11. This cutter has bits A2 and B2 which correspond functionally to the bits A1 and B1 of Figure 3 in that they are used for cutting the respective circular faces A and B. In addition to the bits A2 and B2 the cutter C2 has a bit C3 which may be called an extension bit and is used as a cut-off tool. Whereas in the cutter shown in Figure 3 the peripherally located bit is the bit B1 in the cutter C2 shown in Figures 11 and 12 the peripherally located bit is the bit C3.

Figure 12 shows in broken lines a section S3 which has been cut by a preceding operation of the cutter C2 and in solid lines a section S4 which has been cut by a following operation of the cutter C2, the cutter being shown in its operative relation to the section S4 at the completion of the operation. It will be noted that the extension bit C3 has cut from the bar stock a zone of metal located between the sections S3 and S4 and in this operation has completely severed the section S3. The bit C3 may be arranged to terminate the cutting operation at a point a minuscule fraction of an inch in front of the central longitudinal axis S1 of the bar stock, or at a point in exact coincidence with such axis, or, as is the preferred practice and as shown in Figures 11 and 12, at a point slightly beyond or behind such axis, thereby to completely eliminate any burr or roughness from the end face of the section S4. It is with this preferred practice in mind that the circular forming scale is provided with the short extension 40 in the form shown in Figures 1 and 6 or 40a in the form shown in Figure 10.

In the great majority of cases in which the cutter is to be provided with an extension bit C3 the bits do not require rake angles and this assumption is made for the purpose of explanation. The terminal location of the bit C3 in relation to the central longitudinal axis of the bar stock is a known factor. For the purpose of explanation the arbitrary assumption is made that the radius of the cutter is one and one-half inches.

In this use of the device the bit scale 5 is adjustably moved properly to position its reading which corresponds to the radius of the cutter (i. e. the reading 1.5 in the example assumed) with relation to the zero mark of the circular forming scale, thereby to establish the accurate relative location of the pivot 26 and the zero marking of the circular forming scale as complementary points of reference. If the cutting operation of the bit C3 is to terminate at a point a minuscule fraction of an inch in front of the central longitudinal axis S1 of the bar stock the bit scale is adjustably moved to a position in which its reading 1.5 intersects the calibrated lower edge of the circular forming scale (4 or 4a) at a corresponding point in front of the zero marking. If the cutting operation of the bit C3 is to terminate at a point in coincidence with the central longitudinal axis of the bar stock the bit scale is adjustably moved to a position in which its reading 1.5 intersects the calibrated lower edge of the circular forming scale at the zero marking. If the extension bit C3 at the completion of the operation of the cutter is to be located to a predetermined extent slightly beyond the central longitudinal axis of the bar stock the bit scale is adjustably moved to a position, as shown in Figure 13, in which it intersects the calibrated lower edge of the extension (40 to 40a) of the circular forming scale at a corresponding point. In connection with Figure 13 the arbitrary assumption is made that the bit scale at the completion of the cutting operation is to be located one-twentieth of an inch beyond the central longitudinal axis of the bar stock. Therefore the bit scale is moved to a position in which its upper edge at the point 1.5 (corresponding to the assumed radius of the cutter) intersects the lower edge of the extension (40 or 40a) of the circular forming scale at the half inch mark which, in the ratio of ten to one, corresponds to one-twentieth of an inch as a bar stock measurement. With the points of reference (the pivot 26 and the zero mark of the circular forming scale) thus properly located in accordance with the predetermined final position of the extension bit C3 for use as a cut-off tool the radial dimensions to be ascertained are those of the bits A2 and B2 and are respectively represented in Figure 11 by the broken lines R2 and R3. These operations are carried out as above described in connection with the diagram of Figure 3 where the radial dimension to be ascertained was that of the bit A1 and is represented by the broken line R. For the predetermination of the radial dimension R3 of the bit B2 the bit scale 5 is moved across the circular forming scale 4 to a position in which it intersects the calibrated lower edge of the circular forming scale at the marking corresponding to the known radius of the face B and the dimension is determined by the reading on the bit scale at this point. In like manner for the predetermination of the radial dimension R2 of the bits A2 the bit scale 5 is moved across the circular forming scale 4 to a position in which it intersects the calibrated lower edge of the circular forming scale at the marking corresponding to the known radius of the faces A and the dimension is determined by the reading on the bit scale at this point.

I claim:

1. A device for use in the predetermination of the radial distance of a bit of a circular forming cutter from the axial center of the cutter in cases where the bit is to be located inwardly of a peripherally located bit, is to cut upon bar stock of circular cross section a circular face of less diameter than the diameter of the bar stock, and is to be located in coincidence with a horizontal center line below the axial center of the cutter and coincident with the axial center of the bar stock, the diameters of the cutter and of the bar stock and the circular faces to be cut thereon and the distance of the axial center of the cutter above said center line being known: which comprises, in combination, a flat base, a horizontal line marked on the base and which corresponds to the horizontal center line coincident with the axial center of the bar stock, a straight bar circular forming scale overlying the base and having a lower edge calibrated from a zero marking in suitable multiples of linear units of measurement in terms of the bar stock, the circular forming scale having an operative position in which its lower edge is in coincidence with said horizontal line marked on the base and its zero marking has a fixed location which corresponds to the axial center of the bar stock, a straight bar bit scale overlying both the base and the circular forming scale, the bit scale having an upper edge calibrated from a zero marking in suitable multiples of linear units of measurement in terms of the cutter, the zero markings of the two scales being at their remotely related ends, and a pivot in fixed coincidence with the calibrated upper edge and the zero marking of the bit scale and connecting the bit scale and the base, the pivot being mounted for positively guided vertical positional adjustment with relation to the horizontal line marked on the base, the bit scale in a position normal to and intersecting the horizontal line being manipulatable to effect such an adjustment and the adjustment being measured along the bit scale in such position and being to an extent which determines the location of the pivot with reference to the horizontal line in correspondence to the known location of the axial center of the cutter above the horizontal center line coincident with the axis of the bar stock, means for fixing the pivot in any position of vertical adjustment the pivot in any position to which it may be adjusted vertically also being mounted for positively guided horizontal positional adjustment to establish it as a point of reference complementary to the point of reference provided by the fixedly located zero marking of the circular forming scale, means for fixing the pivot in any position of horizontal adjustment, the bit scale being movable with the pivot in its positional adjustments and in any position to which the pivot may be adjusted being also operatively movable about the pivot over and across the circular forming scale with its calibrated upper edge in intersecting relation to the calibrated lower edge of the circular forming scale, the movements of the bit scale in connection with the horizontal positional adjustment of its pivot and about its pivot being combined to effect a position of the bit scale in which its calibrated upper edge intersects the calibrated lower edge of the circular forming scale at a point which as measured from the zero of the circular forming scale corresponds to the radius of the circular face of minimum diameter to be cut and as measured from the zero of the bit scale corresponds to the radius of the cutter, such point determining the location of the zeros of both scales as fixed points of reference, and the bit scale thereupon, while the circular forming scale remains in said operative position, being further movable only about its pivot as a fixed point of reference to a position in which its calibrated upper edge intersects the calibrated lower edge of the circular forming scale at a point which corresponds to the radius of the circular face of maximum diameter to be cut, the distance of such last named point from the zero of the bit scale corresponding to the radial distance of the bit for cutting the circular face of maximum diameter from the axial center of the cutter.

2. A device as set forth in claim 1 wherein the bit scale is carried by a bracket in the form of a plate overlying the base and having a vertical slot through which the pivot of the bit scale passes and in which it is vertically and positionally adjustable, the bracket being connected to the base for horizontal positional adjustment.

3. A device as set forth in claim 1 wherein the bit scale is carried by a bracket in the form of a plate overlying the base and having a vertical slot through which the pivot of the bit scale passes and in which it is vertically and positionally adjustable, the bracket being formed with an edge flange to limit the downward movement of the bit scale about its pivot to a vertical position in which the bit scale is normal to the horizontal line marked on the plate.

4. A device as set forth in claim 1 wherein the bit scale is carried by a bracket in the form of a plate overlying the base and having a vertical slot through which the pivot of the bit scale passes and in which it is vertically and positionally adjustable, the base being formed with registering narrow and wider slots extending to one end thereof, the narrow slot being open to the upper face of the base and the wider slot being open to its under face, a bolt having its head slidably mounted in the wider slot passes through the narrower slot and through the bracket, a securing nut is mounted on the bolt above the bracket, and the bracket is formed with a horizontal rib which engages in the narrower slot and functions both as a guide for the bracket in the horizontal positional adjustment thereof and to prevent the bracket from turning about the bolt.

5. A device as set forth in claim 1 wherein the base is formed with a horizontal recess and the horizontal line marked on the base is provided by the upper edge of the recess, a plate is slidably fitted in the recess for horizontal positional adjustment, the plate being provided on its upper face with a vertical cross line extending to its upper edge and with a line inclined downwardly from the upper end of the cross line toward that vertical edge of the plate which in an operative position thereof is further from the zero marking of the circular forming scale, the degree of inclination of the downwardly extending line corresponding to a predetermined rake angle, and the circular forming scale is positionally adjustable about a pivotal axis which coincides with the zero marking and calibrated lower edge of the scale and with the horizontal line marked on the base.

6. A device as set forth in claim 1 wherein the base is formed with a horizontal recess of dove-tail cross section and the horizontal line marked on the base is provided by the upper edge of the recess, a plate of conformable cross section has a close fit in the recess and is positionally adjustable therein, the plate being provided on its exposed face with a vertical cross line extending to its upper edge and with a line inclined downwardly from the upper end of the cross line toward that vertical edge which in an operative position of the plate is further from the zero marking of the circular forming scale, the degree of inclination of the downwardly extending line corresponding to a predetermined rake angle, the plate has adjacent one of its horizontal edges a horizontal slot, a strip of metal at the outer side of the slot is peened slightly outward to provide a friction brake for cooperation with the adjacent horizontal wall of the recess, and the circular forming scale is positionally adjustable about a pivotal axis which coincides with the zero marking and calibrated lower edge of the scale and with the horizontal line marked on the base.

7. A device as set forth in claim 1 wherein the circular forming scale is imprinted upon the base and its calibrated lower edge is provided by the line marked on the base.

8. A device as set forth in claim 1 wherein the circular forming scale has a coaxial extension beyond its zero marking, the extension having its lower edge calibrated similarly to the lower edge of the scale, and the bit scale is movable to a position in which its calibrated upper edge intersects the lower edge of the extension.

References Cited in the file of this patent

UNITED STATES PATENTS

| | | |
|---|---|---|
| 288,613 | Bolles | Nov. 20, 1883 |
| 717,381 | Fregoso | Dec. 30, 1907 |
| 1,367,612 | McKinney | Feb. 8, 1921 |
| 1,455,708 | Brown | May 15, 1923 |
| 1,533,097 | Byhre | Apr. 14, 1925 |
| 1,661,095 | Rowe | Feb. 28, 1928 |
| 1,894,886 | Paskowski | Jan. 17, 1933 |
| 2,078,138 | Hansen | Apr. 20, 1937 |